(12) United States Patent
Metcalfe

(10) Patent No.: US 10,986,249 B1
(45) Date of Patent: Apr. 20, 2021

(54) SYSTEM AND METHOD FOR PROCESSING AND ENHANCING ACHROMATIC CHARACTERS OF SCANNED DIGITAL DOCUMENTS

(71) Applicant: Xerox Corporation, Norwalk, CT (US)

(72) Inventor: David J. Metcalfe, Marion, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 16/830,479

(22) Filed: Mar. 26, 2020

(51) Int. Cl.
  *H04N 1/58* (2006.01)
  *H04N 1/60* (2006.01)
  *H04N 1/00* (2006.01)

(52) U.S. Cl.
  CPC .............. *H04N 1/58* (2013.01); *H04N 1/6005* (2013.01); *H04N 1/0044* (2013.01); *H04N 1/6022* (2013.01)

(58) Field of Classification Search
  CPC ........ H04N 1/409; H04N 1/4092; H04N 1/58; H04N 1/6005; H04N 1/608; G06K 15/1847; G06K 15/1871
  See application file for complete search history.

(56) References Cited

U.S. PATENT DOCUMENTS

| | | | | |
|---|---|---|---|---|
| 7,551,334 B2* | 6/2009 | Li | ......................... | H04N 1/4072 358/3.23 |
| 7,843,616 B2* | 11/2010 | Li | ......................... | H04N 1/6094 358/518 |
| 7,873,232 B2* | 1/2011 | Malik | .................... | H04N 1/407 382/274 |
| 2002/0159080 A1* | 10/2002 | Feng | ..................... | H04N 1/403 358/1.9 |
| 2017/0255849 A1 | 9/2017 | Xing et al. | | |

* cited by examiner

*Primary Examiner* — Scott A Rogers
(74) *Attorney, Agent, or Firm* — Fay Sharpe LLP

(57) ABSTRACT

An image processing device includes a neutral edge detection and enhancement component which, for pixels of an input image, computes an edge strength for the pixel as a function of differences between the input luminance value of the pixel and input luminance values of neighboring pixels, computes a neutral adjustment factor for the pixel as a function of the input luminance value of the pixel, and computes a chroma adjustment factor for the pixel as a function of the input chrominance values of the pixel. An adjusted luminance value for the pixel is computed as a function of the input luminance value, the edge strength, and the neutral adjustment factor. Adjusted chrominance values for the pixel may be computed as a function of the input chrominance value, the edge strength, and the chroma adjustment factor. The system allows detection and enhancement of neutral edges in monochrome and color images.

20 Claims, 15 Drawing Sheets

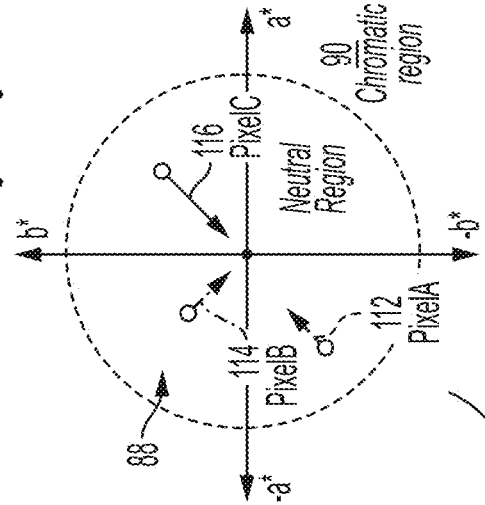
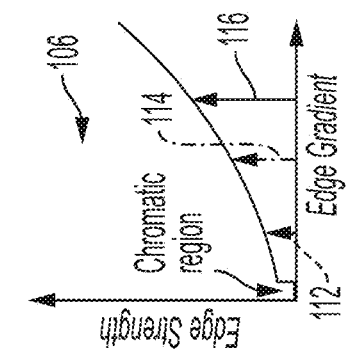
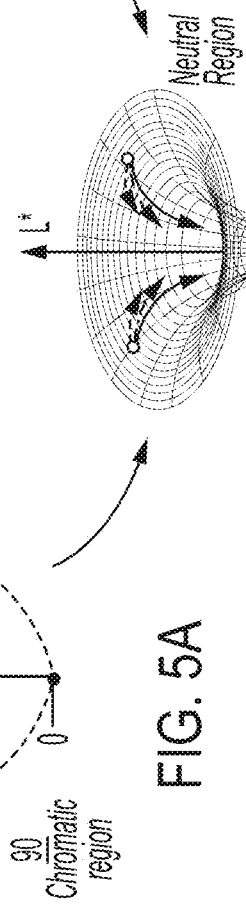
FIG. 5A
FIG. 5B
FIG. 5C

*AaBbCcDdGgMmNnTt*
GlobalNeutralAdjustFactor = 0.00
GlobalChromaAdjustFactor = 0.00

*AaBbCcDdGgMmNnTt*
GlobalNeutralAdjustFactor = 0.25
GlobalChromaAdjustFactor = 0.25

*AaBbCcDdGgMmNnTt*
GlobalNeutralAdjustFactor = 0.50
GlobalChromaAdjustFactor = 0.50

*AaBbCcDdGgMmNnTt*
GlobalNeutralAdjustFactor = 0.75
GlobalChromaAdjustFactor = 0.75

*AaBbCcDdGgMmNnTt*
GlobalNeutralAdjustFactor = 1.00
GlobalChromaAdjustFactor = 1.00

*AaBbCcDdGgMmNnTt*
GlobalNeutralAdjustFactor = 1.50
GlobalChromaAdjustFactor = 1.00

*AaBbCcDdGgMmNnTt*
GlobalNeutralAdjustFactor = 2.00
GlobalNeutralAdjustFactor = 1.00

SYSTEM AND METHOD FOR PROCESSING AND ENHANCING ACHROMATIC CHARACTERS OF SCANNED DIGITAL DOCUMENTS

CROSS REFERENCE TO RELATED PATENTS AND APPLICATIONS

Cross-reference is made to copending application Ser. No. 16/830,419, entitled SYSTEM AND METHOD TO DETECT AND ADJUST IMAGE BACKGROUND, by Metcalfe, et al., filed Mar. 26, 2020, the disclosure of which is incorporated herein by reference in its entirety.

BACKGROUND

The exemplary embodiment relates to image adjustment and finds particular application in connection with a system and method for adjustment of edges of achromatic characters and line drawings in scanned digital documents.

Digital image capture devices, such as scanners and cameras, capture images as an array of pixels, with each pixel being assigned a set of color values in a multi-dimensional color space, referred to herein as an input color space, such as an RGB (red, green, blue) color space. Processing images captured by such digital devices is generally performed in a multi-dimensional color space with a larger gamut, referred to herein as a processing color space, such as the CIE L*a*b* color space. The processed image may then be converted to a multi-dimensional output color space, suitable for rendering the processed image, such as CMYK (Cyan, Magenta, Yellow, and Black), in the case of printing.

During image processing, various adjustments to the image may be made. These adjustments are often performed sequentially, and may include image resolution adjustments, color corrections, removal of undesirable artifacts, cropping, and background suppression. The final print quality of a color copy depends, in part, on the ability to reproduce and/or enhance text and line-art (such as vector graphics and hand-drawn illustrations).

Methods have been developed to detect and enhance edges of text characters so that these appear sharper. These include detecting sharp changes between substantially black pixels and neutral (substantially white) pixels and shifting the substantially black pixels to maximum black, e.g., by setting C, M, and Y components to zero and applying maximum K. This processing is performed in the device-dependent color space domain by modifying the 8 bpp CMYK image prior to being decimated to 1 bpp via error diffusion.

However existing threshold-based segmentation classification algorithms used to detect neutral color (achromatic) regions, whose color is substantially along the L* dimension, can cause artifacts in colored text and line-art. This can result in sub-par image quality, particularly in the case of documents containing mixed content (e.g., a combination of photos, halftones, gray text and line-art). Although image quality is a rather subjective measure, particularly in the case of edge effects, it can be assessed by processing a test pattern and evaluating how well the gray and black text in the test pattern is reproduced. In some cases, several different image processing techniques may be evaluated to select an optimum technique for reproducing a given image or set of images, which can be time consuming.

While more complex techniques, such as object-based detection and classification algorithms, can yield improvements in image quality, they are generally unsuited to processes requiring high-speed image throughput rates, such as high-speed printers. Further, the move to higher bit-depths for image rendering (e.g., 4, 8 or more bits per pixel (bpp)), makes edge correction more challenging, since slight pixel segmentation misclassification errors may reveal or accentuate undesirable rendering artifacts. Such artifacts may have otherwise been concealed when using 1 bpp bit-depths since print image quality deficiencies are generally suppressed or masked by decimating the CMYK output to a 1 bpp bit-depth via error diffusion or some other halftone rendering method.

There remains a need for a system and method for rapid processing of black and gray edges of text and line-art images to improve image quality, while minimizing abrupt switching artifacts that can occur through pixel misclassifications.

BRIEF DESCRIPTION

In accordance with one aspect of the exemplary embodiment, an image processing device includes memory which stores a neutral edge detection and enhancement component which for each of a plurality of pixels of an input image, each having an input luminance value and input chrominance values: computes an edge strength for the pixel as a function of differences between the input luminance value of the pixel and input luminance values of neighboring pixels, computes a neutral adjustment factor for the pixel as a function of the input luminance value of the pixel, and optionally computes a chroma adjustment factor for the pixel as a function of the input chrominance values of the pixel. The neutral edge detection and enhancement component computes at least one of: an adjusted luminance value for the pixel as a function of the input luminance value, the edge strength, and the neutral adjustment factor, and adjusted chrominance values for the pixel as a function of the input chrominance value, the edge strength, and the chroma adjustment factor. An image output component outputs an output image derived from the at least one of the adjusted luminance and adjusted chrominance values for the plurality of pixels. A processor implements the neutral edge detection and enhancement component and the image output component.

In accordance with another aspect of the exemplary embodiment, an image processing method includes receiving an input image comprising a plurality of pixels, and for each of the plurality of pixels: computing an edge strength for the pixel as a function of differences between the input luminance value of the pixel and input luminance values of neighboring pixels, computing a neutral adjustment factor for the pixel as a function of the input luminance value of the pixel, and optionally computing a chroma adjustment factor for the pixel as a function of input chrominance values of the pixel. The method further includes computing at least one of: an adjusted luminance value for the pixel as a function of the input luminance value, the edge strength, and the neutral adjustment factor, and adjusted chrominance values for the pixel as a function of the input chrominance value, the edge strength, and the chroma adjustment factor. An output image derived from at least one of the adjusted luminance and the adjusted chrominance values for the plurality of pixels is output.

One or more steps of the method may be performed with a processor device.

In accordance with another aspect of the exemplary embodiment, an image processing device includes a neutral edge detection and enhancement component which for each of a plurality of pixels of an input image, each having an input luminance value and input chrominance values: computes an edge strength for the pixel as a function of differences between the input luminance value of the pixel and input luminance values of neighboring pixels, computes a neutral adjustment factor for the pixel as a function of the input luminance value of the pixel, computes a chroma adjustment factor for the pixel as a function of the input chrominance values of the pixel, computes an adjusted luminance value for the pixel as a function of the input luminance value, the edge strength, and the neutral adjustment factor, and computes adjusted chrominance values for the pixel as a function of the input chrominance value, the edge strength, and the chroma adjustment factor. An image output device receives an output image derived from the adjusted luminance and adjusted chrominance values for the plurality of pixels, and renders the output image by printing.

BRIEF DESCRIPTION OF THE DRAWINGS

FIGS. 5A-5C illustrate application of an edge strength function to pixels in the neutral region, where FIG. 5A illustrates adjustment to L* values, FIG. 5B illustrates adjustments to chroma values, and FIG. 5C illustrates an exemplary function which relates edge strength to edge gradient and a three dimensional combination of FIGS. 5A and 5B;

FIG. 14 illustrates the effect of varying a global neutral adjust factor and a global chroma adjust factor on the image quality of text snippets.

DETAILED DESCRIPTION

Figure 1:
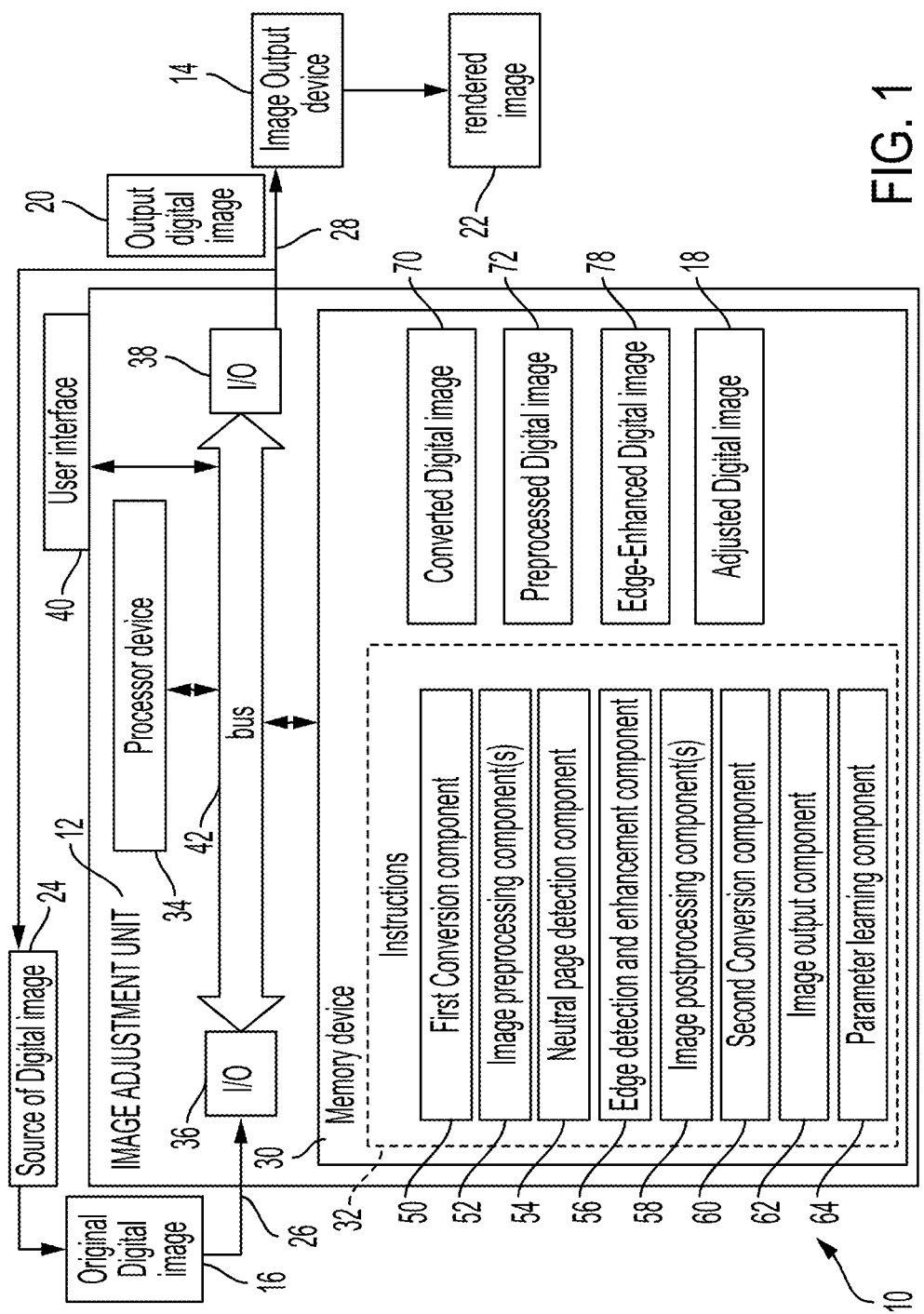
FIG. 1 is a functional block diagram of an image processing system in accordance with one aspect of the exemplary embodiment.

Aspects of the exemplary embodiment relate to an image processing method and system for processing images, particularly those including achromatic edges of text characters, line-art, or photographs. The edge processing may form a step in a software image path (SWIP), as described herein, or be performed as a stand-alone operation. In one embodiment, the system and method incorporate other image processing components/steps during the conversion of an original image, such as a scanned document page, to an output digital image suitable for rendering. The edge processing is performed in a variable manner in order to at least reduce, or to avoid, abrupt switching artifacts that are typically generated in many threshold-based segmentation classification algorithms.

The exemplary system and method provide a relatively simple and robust single-pass pixel segmentation that targets neutral gray/black text and line-art. The method can provide higher print quality while at the same time minimizing the collateral artifacts caused by pixel misclassifications. In the exemplary segmentation, pixels of the image are classified as achromatic (i.e., neutral) edge pixels, or not. However, the subsequent correction non-binary, but rather is a function of a measure of confidence in the classification.

"Print media," as used herein, can be a physical sheet of paper, plastic, or other suitable physical print media substrate for carrying images. For example, the print media can be substantially any type of media upon which a marking engine can print, such as: high quality bond paper, lower quality "copy" paper, overhead transparency sheets, high gloss paper, colored paper, and so forth. A "job" or "document" is referred to for one or multiple sheets copied from an original job sheet(s) or an electronic document page image, from a particular user, or otherwise related. Accordingly to systems and methods herein, a "job" can be a print job, a copy job, a scan job, etc.

An "original image" or "input image" is used herein to mean an electronic (e.g., digital) recording of information. The original image may include image data in the form of text, graphics, or bitmaps. An image may constitute an entire page of a digital document or a part thereof.

An "output image" is used to mean an electronic (e.g., digital) recording of information in a suitable form for rendering by an image output device, such as a marking engine.

As used herein, an "image output device" can include any device for displaying an image or rendering an image on print media, such as a copier, laser printer, bookmaking machine, facsimile machine, or a multi-function machine (which includes one or more functions such as scanning, printing, archiving, emailing, and faxing), which are generally referred to herein as printers.

As used herein, a "pixel" refers to the smallest segment into which an image can be divided. Received pixels of an input image are associated with a color value defined in terms of a color space, such as color, intensity, lightness, brightness, or some mathematical transformation thereof. Pixel color values may be converted to a chrominance-luminance space, such as L*a*b*, using, for instance, an RGB-to-L*a*b* converter to obtain luminance (L*) and chrominance (a*b*) values. It should be appreciated that pixels may be represented by values other than RGB or L*a*b*.

In the exemplary method, edge enhancement processing is performed in the device-independent color space domain, such as L*a*b*, where the luminance and chrominance planes can be more precisely adjusted relative to existing methods that operate in device-dependent color space.

The L*a*b* color space has an L dimension for lightness and chromatic a and b dimensions that are color-opponent dimensions that are based on nonlinearly compressed coordinates. The L*a*b* color space includes all perceivable colors, which means that its gamut exceeds those of the RGB and CMYK color spaces. The L*a*b* color space is device independent, which means that the colors are defined independent of their nature of creation or the device on which they are output (displayed or rendered).

FIG. 1 illustrates an exemplary image processing device 10. The image processing device includes an image adjustment unit 12 and optionally an image output device 14. The image adjustment unit 12 receives an original digital image 16, such as a scanned image, in a first (input) color space, such as RGB. The image adjustment unit 12 converts the original image 16 to a second color space, such as a luminance-chrominance color space, e.g., L*a*b*, in which image adjustments are made to form an adjusted digital image 18. The adjustments include neutral edge detection and correction, if needed. The image adjustment unit 12 may convert the adjusted digital image 18 to an output digital image 20 in a third (output) color space, in which the output device 14 operates, such as CMYK. The exemplary output device 14 may include a marking engine which renders the output digital image 20 on print media, using marking materials, such as inks or toners, to form a rendered (generally, hardcopy) image 22. The image processing device 10 may further include or be communicatively connected with a source 24 of original digital images, such as a scanner or a computing device. Components 12, 14, 24 of the image processing device 10 may be communicatively connected by wired or wireless links 26, 28, such as wires, a local area network, or a wide area network, such as the Internet.

The image adjustment unit 12 includes memory 30 which stores software instructions 32 for performing the processing steps that generate the adjusted image 18 and output image 20. A processor 34, in communication with the memory 30, executes the instructions. The image adjustment unit 12 also includes one or more input/output (I/O) devices 36, 38 for receiving original images 16 and outputting the output images 20. A user interface allows a user to make adjustments to certain parameters, as discussed below. Hardware components 30, 34, 36, 38, 40 of the image correction unit 12 may communicate via a data/control bus 42.

The image adjustment unit 12 may include one or more computing devices, such as a dedicated computing device configured for controlling the operations of a printer, a PC, such as a desktop, a laptop, palmtop computer, portable digital assistant (PDA), server computer, cellular telephone, tablet computer, pager, combination thereof, or other computing device capable of executing instructions for performing the exemplary method.

The memory 30 may represent any type of non-transitory computer readable medium such as random-access memory (RAM), read only memory (ROM), magnetic disk or tape, optical disk, flash memory, or holographic memory. In one embodiment, the memory 30 comprises a combination of random-access memory and read only memory. In some embodiments, the processor 34 and memory 30 may be combined in a single chip. Memory 30 stores instructions for performing the exemplary method as well as the processed data.

The network interface 36, 38 allows the computer to communicate with other devices via a computer network, such as a local area network (LAN) or wide area network (WAN), or the internet, and may comprise a modulator/demodulator (MODEM) a router, a cable, and/or Ethernet port.

The digital processor device 34 can be variously embodied, such as by a single-core processor, a dual-core processor (or more generally by a multiple-core processor), a digital processor and cooperating math coprocessor, a digital controller, or the like. The digital processor 34, in addition to executing instructions 32 may also control the operation of the image output device 14.

The term "software instructions," or simply "instructions," as used herein, is intended to encompass any collection or set of instructions executable by a computer or other digital system so as to configure the computer or other digital system to perform the task that is the intent of the software. The term "software instructions" is intended to encompass such instructions stored in storage medium such as RAM, a hard disk, optical disk, or the like, and is also intended to encompass so-called "firmware" that is software stored on a ROM or the like. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

The illustrated software instructions 32 include a first (input image) conversion component 50, optionally one or more image preprocessing components 52, a neutral page detection component 54, an edge detection and enhancement component (or simply "edge component") 56, optionally one or more image postprocessing components 58, a second (adjusted image) conversion component 60, an image output component 62 and optionally a parameter learning component 64.

Figure 2:
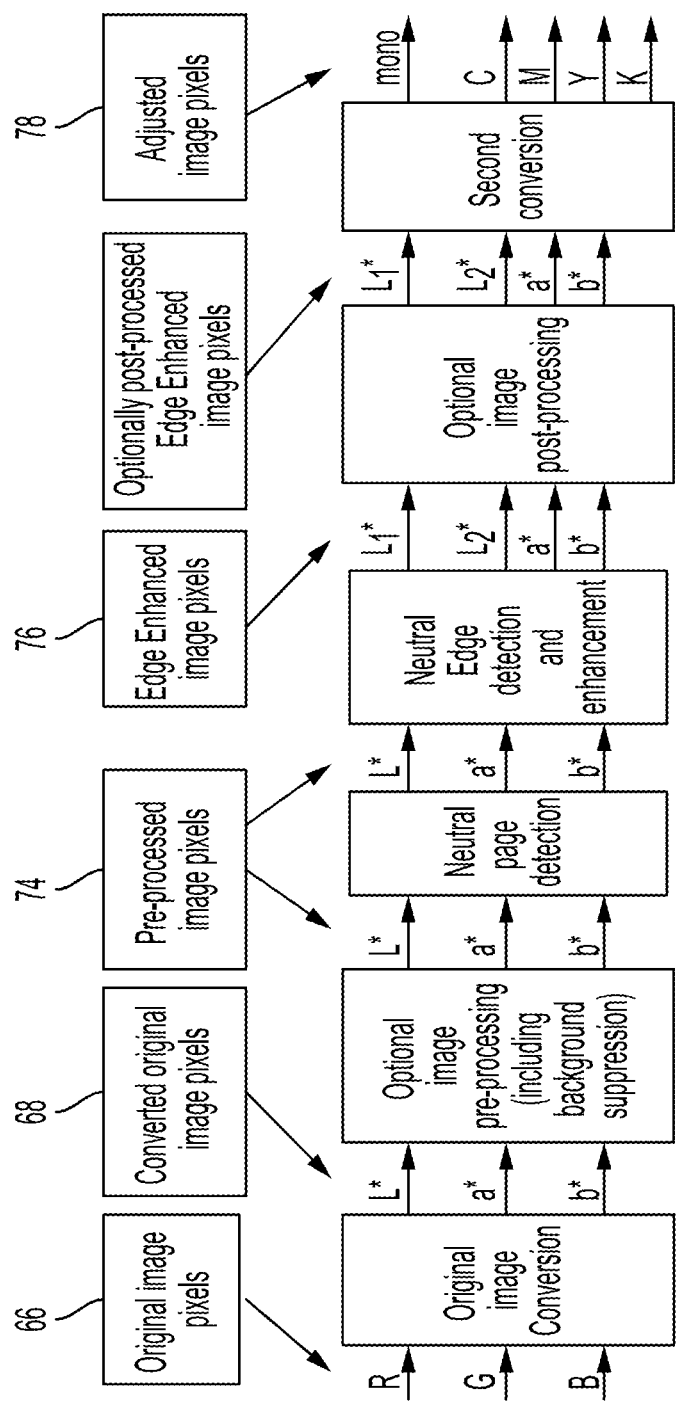
FIG. 2 is a simplified diagram of a software image path suited to use in the system of FIG. 1.

Briefly, with reference also to FIG. 2, the first conversion component 50 receives the original image 16 in the first (input) color space and converts the pixels 66 of the original image 16 to pixels 68 forming a converted image 70 in the second (processing) color space. The input color space may be any suitable multi-channel color space or monochrome color space in which digital images are generated and/or stored. The processing color space may be any suitable luminance-chrominance color space. For example, the conversion is illustrated in FIG. 2 by conversion from RGB to L*a*b*. As will be appreciated, if the original image is already in the second color space, the first conversion component 50 may be omitted. This step is performed for all pixels of the image.

The optional image pre-processing component(s) 52 may perform various preprocessing operations on the converted image pixels 68 in the second color space, prior to neutral edge enhancement. These operations may include one or more of background suppression, cropping, scaling, padding, and the like. As will be appreciated, one or more of these operations may additionally or alternatively be performed later in the software image path. The output of the preprocessing is an optionally preprocessed image 72 containing (preprocessed) image pixels 74 in the second color space.

In Autocolor applications, the optional neutral page detection component 54 detects neutral pages, i.e., determines, for each page or image thereof, whether the page should be rendered by K-only (monochrome) or by CMYK (multi-color) inks/toners. A threshold may be set on some measure of color and those pages which fall below the threshold are assigned to the K-only path, with the rest assigned to the multi-color path. In some cases, the customer may be able to select the threshold, e.g., to reduce cost incurred by printing pages in color, when not necessary. Alternatively, the neutral page detection component 54 may be omitted and all pages processed for CMYK printing.

The edge component 56 performs edge detection and enhancement on all or at least some of the pages. The output of the edge enhancement operation is edge enhanced image pixels 76, i.e., pixels of an edge-enhanced image 78, some of which have been adjusted with the objective of providing edge enhancement, As illustrated in FIG. 2, in addition to outputting values for the a* and b* channels, the L* channel of the edge enhanced image 78 is optionally split into two L* channels, denoted $L_1^*$ and $L_2^*$, for separate monochrome and multi-color conversion and post-processing, based on the decision made by the neutral page detection component 54.

The optional image postprocessing component(s) 58 may perform various postprocessing operations on the edge enhanced image 78 in the modified second color space to form the adjusted image 18. Where no postprocessing is performed, the enhanced image 78 serves as the adjusted image 18. The images 16, 18, 70, 74, 78 may be temporarily stored in memory 30, or in a separate memory, during processing.

The second conversion component 60 converts the edge enhanced image 78 (before or after postprocessing) to a third color space, such as CMYK The image output component 62 outputs an output image 20 in the third color space to the image output device 14, e.g., via the I/O device 38. The output image 20 is derived from the edge enhanced image 78 by conversion to the output color space.

The parameter learning component 64 learns and/or updates parameters of look-up tables, global parameters, and the like used in the exemplary system through evaluations of training images.

Figure 3:
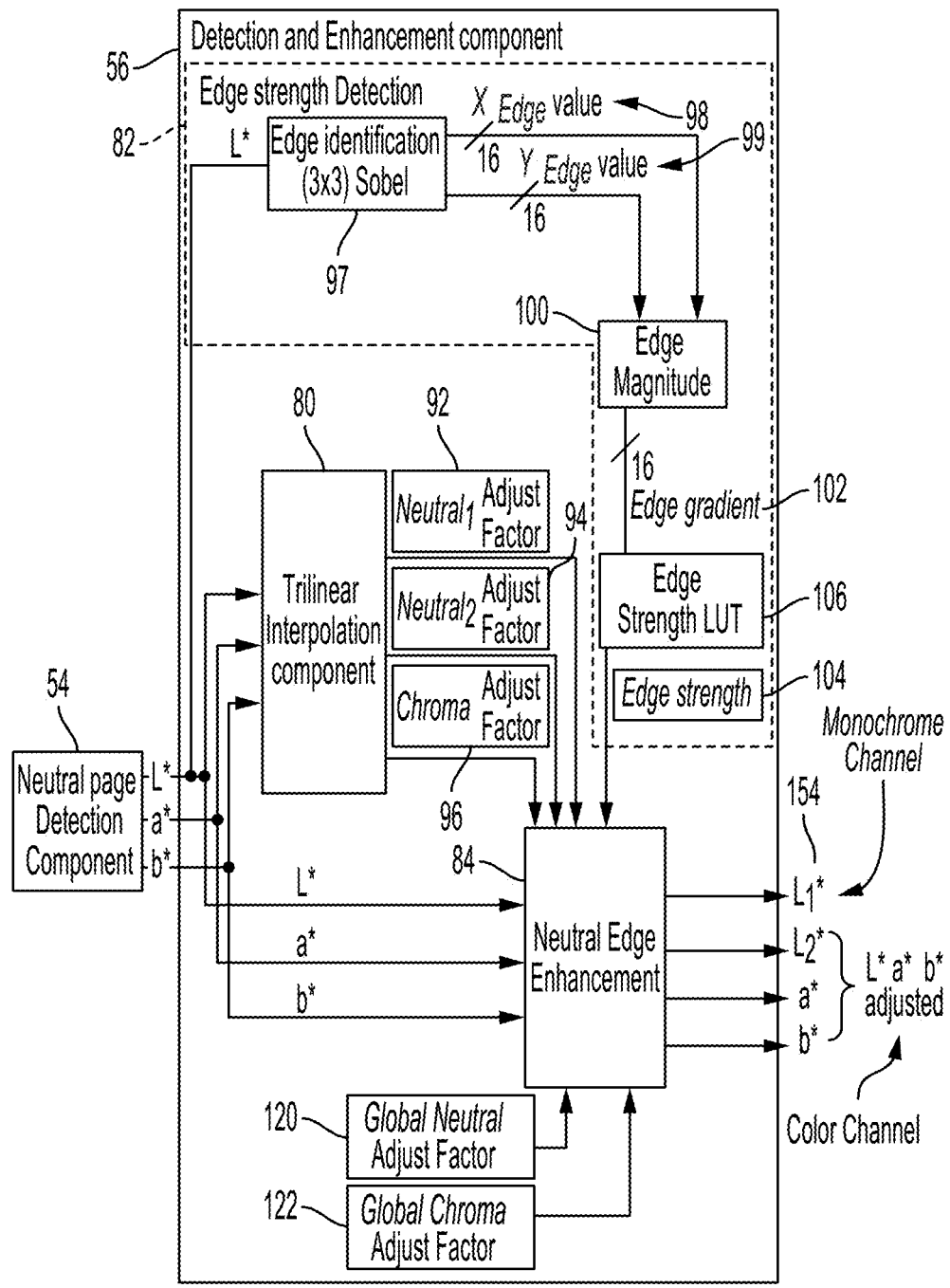
FIG. 3 is a functional block diagram illustrating a neutral page enhancement component for the system of FIG. 1.

FIG. 3 illustrates the neutral edge detection and enhancement component 56 in accordance with one aspect of the exemplary embodiment. The processing of pixels is performed in the device-independent L*a*b* color space domain, where the luminance and chrominance planes can be more precisely adjusted as compared with existing edge enhancement systems operating in input color space. However, other luminance-chrominance color spaces could alternatively be employed. The illustrated edge component 56 includes an adjustment factor computation component 80, an edge detection component 82, and a neutral edge enhancement component 84.

Figure 4:
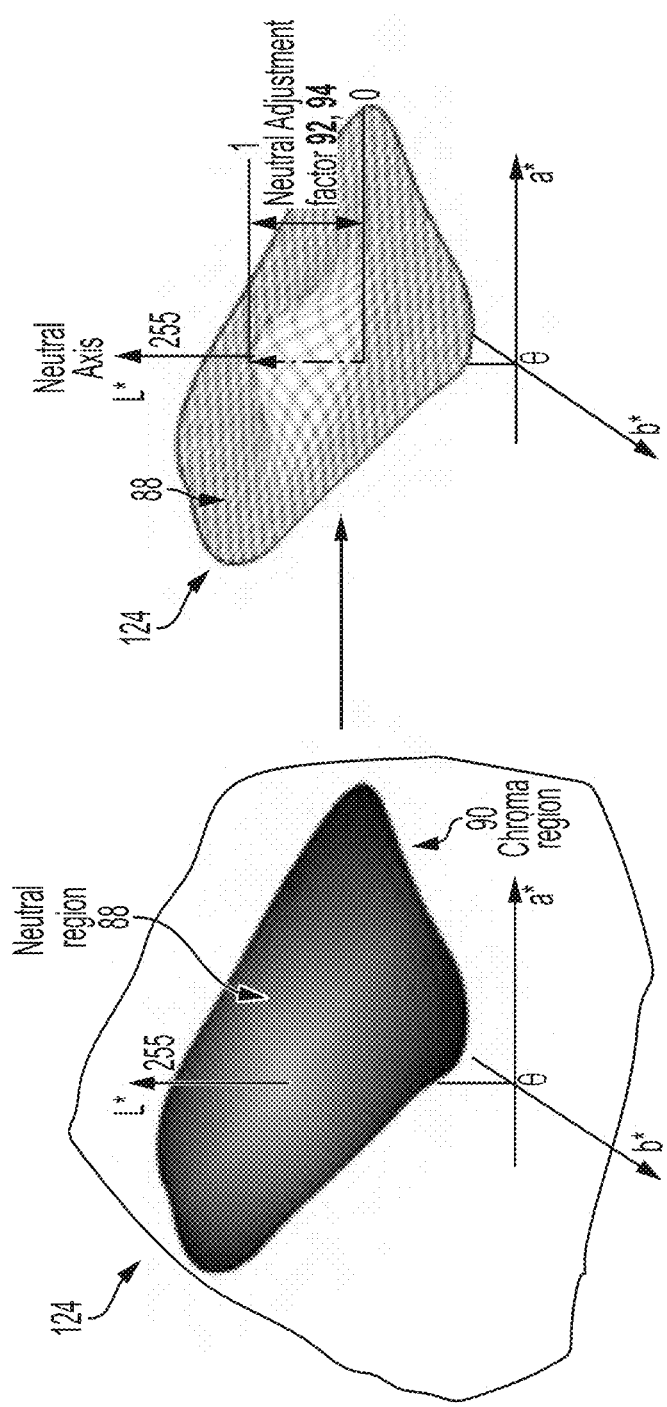
FIG. 4 is a three-dimensional plot illustrating a neutral region of the color gamut and adjustment of pixel values within the neutral region.

The adjustment factor computation component 80 considers each pixel independently of the others and functions as a look up table to assign adjustment factors to the pixel based solely on its input luminance and chrominance values. In particular, the component 80 computes an adjustment factor for one or more of the L* a*, and b* channels of the input image as a non-binary function of the respective channel value. The adjustment factor computation component 80 may include a trilinear interpolation component (e.g., a trilinear interpolation GPU kernel), which is programmed to segment areas of the color gamut into a first region 88, which is to be the focus of neutral edge enhancement, and a second region 90, in which the pixels are to be left unchanged (or substantially unchanged) (FIG. 4). In the exemplary embodiment, the first region 88 is a high-neutral region, while the second region is a high-chroma region. The neutral region's focal point is typically centered around the neutral (L*) axis, with the achromatic field extending beyond the neutral axis as a function of the L* value. The interpolation component 80, in this case, provides a convenient and precise method in which to partition the color gamut between an achromatic (neutral) region 88, where pixels can receive adjustment, and a chromatic region 90, where pixels receive no neutral edge adjustment.

In trilinear interpolation, lattice points in L*a*b* gamut space are associated with respective neutral adjustment factors. Component 80 identifies the eight closest neighboring lattice points for the pixel and calculates neutral adjustment factors for the pixel by linearly weighting the eight lattice point neutral adjustment factors according to the respective Euclidean distances from the pixel to the lattice point. The neutral region 88 is defined and generated by programming the trilinear interpolation lattice points and input remapping LUTs to appropriately partition the regions of the L*a*b* gamut that are classified as achromatic/neutral versus chromatic. Since these are adjustable, the achromatic and chroma regions 88, 90 are also adjustable, to suit a user's preferences.

The system and method are not limited to the first and second regions 88, 90 being neutral and chromatic regions, respectively. Since the trilinear interpolation lattice points and remapping LUTs can be programmable, any color could be targeted, such as uniquely enhancing "red" text and line-art by "driving" only "pinkish/reddish" pixels toward a higher saturated red hue (versus pure-black).

The interpolation component 80 receives, as input, the L*a*b* values for each pixel and outputs first and second neutral adjustment factors 92, 94 for first and second luminance channels $L_1^*$ and $L_2^*$, respectively, and a chroma adjustment factor 96, for the chrominance channels (a* and b*). Each of the factors can assume a range of values. These adjustment factors are input to the neutral edge enhancement component 84. The neutral adjustment factor 92 is used for monochrome images and neutral adjustment factor 94 is used for color images. By computing both, it avoids the need to determine whether the image is monochrome or color. The neutral adjustment factors 92, 94, 96 are each 0<neutral adjustment factor≤1 in the predefined neutral region of the color gamut and neutral adjustment factor=0 in the predefined chroma region.

FIG. 4 graphically illustrates the neutral adjustment factors 92, 94 which may be generated by the trilinear interpolation kernel 80. For illustrative purposes, these can be computed, for example, for a synthetic L*a*b* image at 8 bpp consisting of all pixel combinations ($256^3$=~16 million color combinations). The lighter regions of the 8 bpp neutral region 88 indicate highly achromatic (neutral) areas, where a level of "255" resides closest to the L* neutral axis. A level of "0" corresponds to highly-chromatic regions of sufficient (a*b*) values. The adjustment factor 92, 94 for a pixel in the neutral region 88 may be computed as a function of the pixel's Euclidian distance from the neutral axis, with pixels closer to the neutral axis being accorded a higher adjustment factor 94, 96 (1 being the highest and 0 being the lowest, in this illustration). In the chroma region 90 (the region of high chromaticity bounding the neutral region 88), the neutral adjustment factor 92, 94 is 0. The pixel's chroma components (a*b*) in the neutral region are neutralized to an extent which is an inverse function of the pixel's Euclidian distance from the neutral axis to provide the pixel's adjustment factor 96. In the chroma region 90, the chromatic adjustment factor 96 is 0.

The neutral adjustment and chroma adjustment factors 92, 94 illustrated in FIG. 4 (and similarly, the chroma adjustment factors) are generated by the trilinear interpolation kernel when properly programmed to segment areas of the color gamut classified as either "highly-achromatic" or "highly-chromatic" pixel regions.

The edge detection component 82 identifies the regions in an image where a sharp change in intensity or a sharp change in color occurs, a high value indicates a steep change and a low value indicates a shallow change. The exemplary edge detection component may include an edge identification component 97, such as a Sobel filter 97, which includes a pair of 3×3 (or 5×5, or larger) convolution kernels, one for each of x and y directions. Each 3×3 kernel considers nine pixels, with the pixel of interest as the center pixel. The output of component 97 is a respective edge value 98, 99 for each of the x and y directions of the image, e.g., on a scale of 0-1 or a 16-bit value. The edge value 98, 99 is an average difference in opposite directions (left, right or up, down, respectively). The x direction edge value is a function of the sharpness of the edge in the x direction, while the y direction edge value is a function of the sharpness of the edge in the y direction (measured as an average of the difference between adjacent L* values). Thus, where a pixel is surrounded by eight pixels of substantially the same L* value, its x and y direction edge values will both be low, corresponding to a low probability of the pixel being on an edge. In the case of a pixel which is on an edge that extends in the y direction, the x direction edge value will be high, due to the sharp change in L* values from the pixel's column, to one of the adjacent columns of 3 pixels. Although, the y direction edge value will be low, the high x direction edge value is indicative of a high probability of the pixel being on an edge. A pixel on a diagonal edge will have significant x and y direction edge values, indicative of a high probability of the pixel being on an edge. The edge detection is independent of the chromaticity of the pixel, and thus can detect edges between red and neutral rows of pixels, for example. This can be used, in some embodiments, to enhance edges of different colors.

The edge detection component further includes an edge magnitude component 100 which computes an edge gradient 102 as a function of the output of the filter 97. The edge magnitude component 100 receives as input the x and y direction edge values 98, 99, which in the exemplary embodiment are each 16-bit values. The component 100 computes the edge gradient 102 as a function of the edge values 98, 99, e.g., using the formula edge gradient=$\sqrt{x^2+y^2}$. The resulting edge gradient is thus independent of the direction of the edge on which the pixel may lie.

The edge identification component 97 and edge magnitude component 100 thus generate a composite edge gradient 102, which is an indicator of the level of a pixel's text/font sharpness. Similar to the neutral and chroma adjust factors 92, 94, 96, the edge gradient 102 is not a purely binary edge-tag but rather a multi-level value that can be used to modulate the amount or level of L*a*b* adjustment on a pixel-by-pixel (one-pass, point process) basis.

Figure 6A:
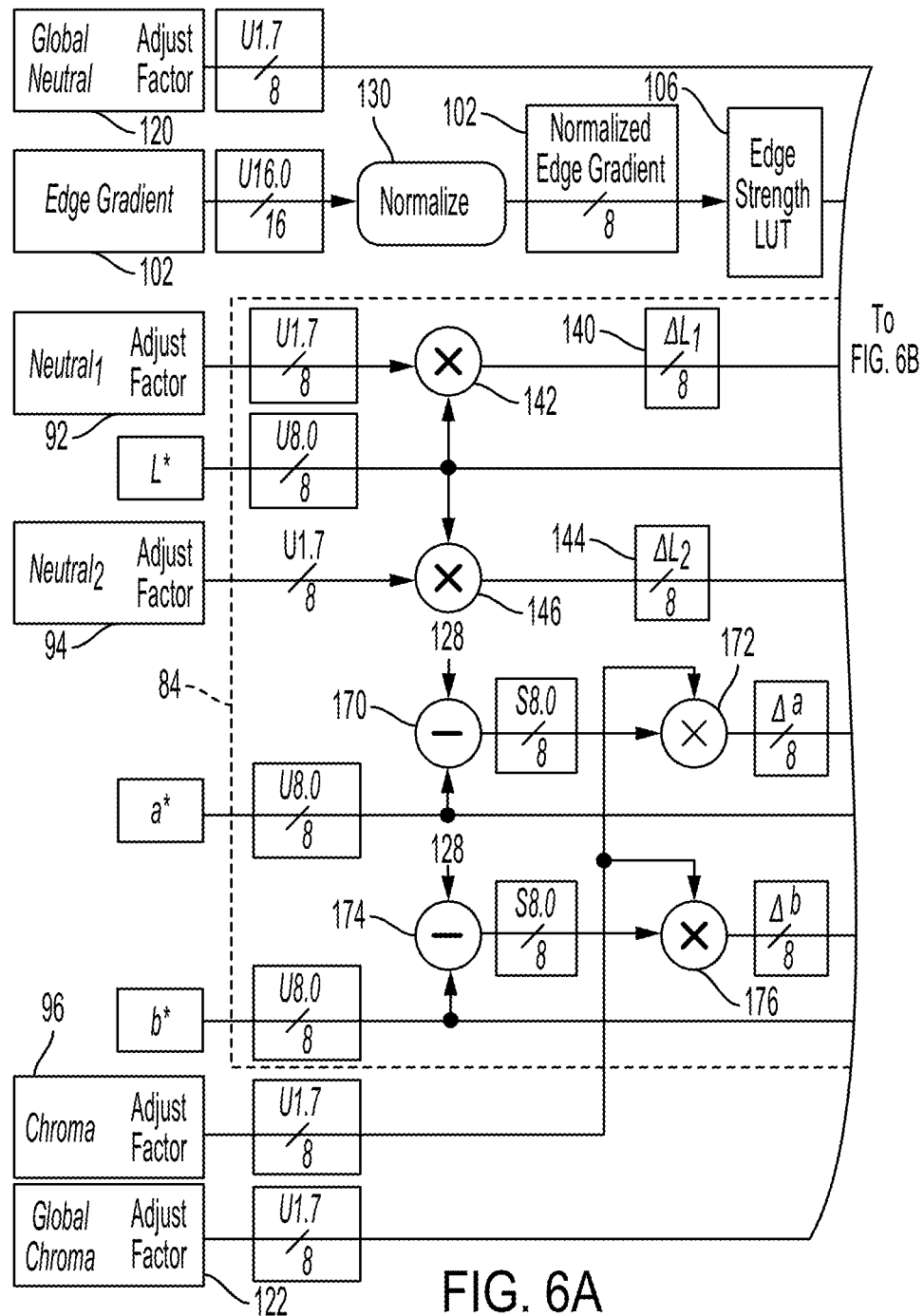
FIGS. 6A-6B together show a functional block diagram of the neutral edge enhancement component of FIG. 3.
Figure 6B:
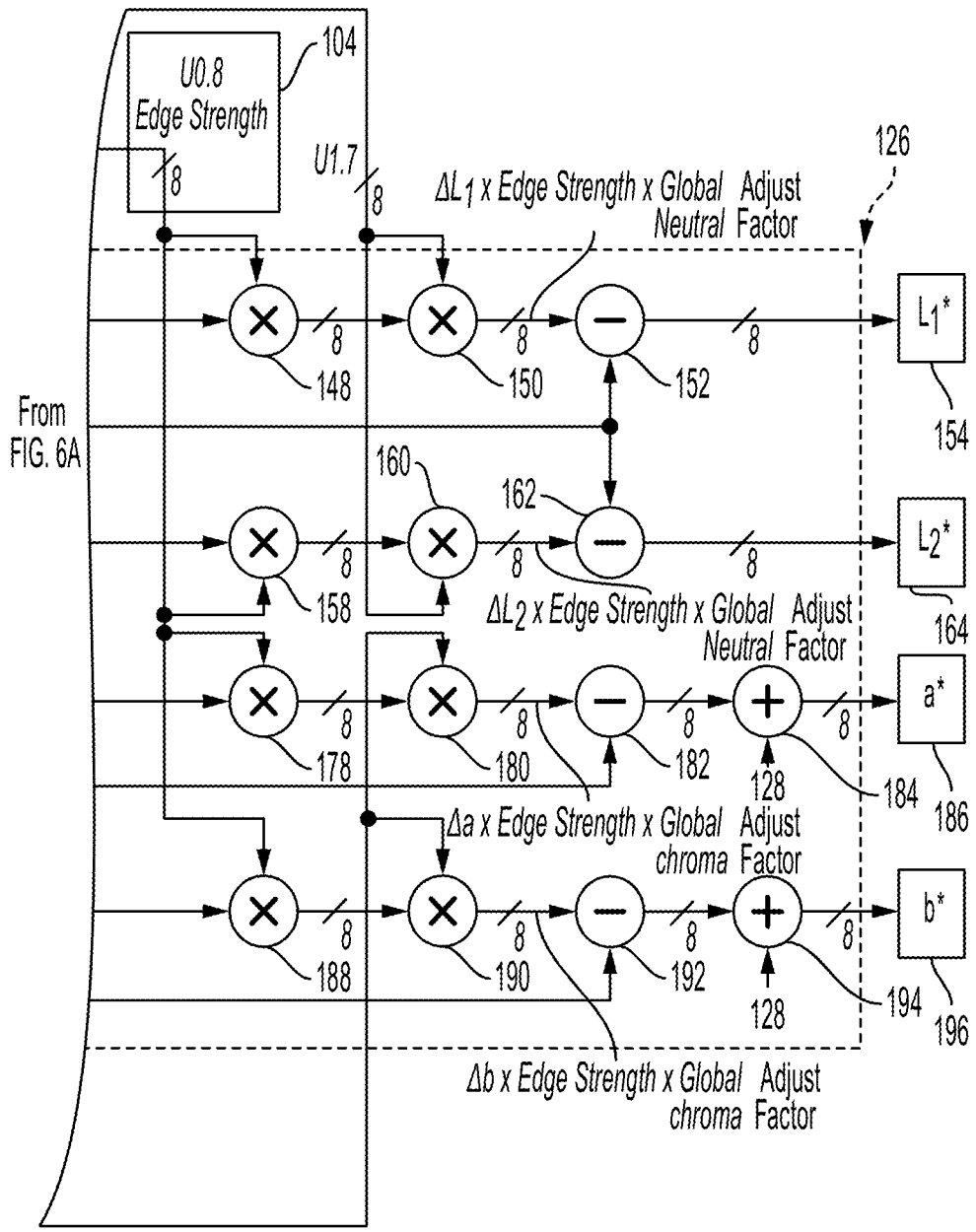

The edge gradient 102 may be converted to an edge strength 104 through a non-linear operation, such as with an edge strength look-up table (LUT) 106, before being input to the neutral edge enhancement component 84. An example LUT 106 is represented as a graph in FIG. 5C. For pixels in the neutral region 88, the edge strength 104 is seen to increase exponentially with increasing edge gradient 102, although other functions are contemplated. In one embodiment, the edge strength of a pixel has a value of from 0-255, with 255 representing the highest likelihood that the pixel is on an edge and 0 being the lowest. For pixels in the chromatic region 90, the edge strength is set to 0. The 16-bit edge gradient 102 may be normalized to an 8-bit range (0-255) prior to conversion to an edge strength 106 (FIGS. 6A-6B).

The neutral edge enhancement component 84 optionally also receives, as input, a global neutral adjustment factor 120 and/or a global chroma adjustment factor 122. The neutral edge enhancement kernel 84 uses the adjustment factors 92, 120, 122, and edge gradient 102 (or edge strength 104) to process the input L*a*b* values of the digital image 74.

The neutral edge enhancement component 84 includes one or more sub-components, which are discussed in more detail with reference to FIGS. 6A-6B. Briefly, the neutral edge enhancement component 84 adjusts the L*, a*, and b* values of the pixels that are in the neutral region 88 of the gamut (i.e., on or within a border 124 of the neural region which separates the neutral region from the chroma region 90, which occupies the remainder of the color gamut), by applying a variable adjustment. The component 84 uses the first neutral adjustment factor 92 to modify the level of edge adjustment that should be applied to the monochrome channel in an autocolor copy application (corresponding to the L1* output) and uses the second neutral adjustment factor 94 to adjust the level of edge enhancement applied to the L2* output (corresponding to the L*a*b* color triplet). The chroma adjustment factor 96 is used to modulate the a*b* components in order to suppress abrupt switching artifacts for pixel values that reside between the chromatic and neutral regions 90, 88. Potential neutral-edge pixels are thus adjusted in a variable manner in order to avoid/minimize the abrupt switching artifacts that are typically generated in many threshold-based segmentation classification algorithms. In other words, the extent in which any L*a*b* pixel triplet is driven toward a pure "black" pixel (i.e., L*a*b*=0, 0, 0, respectively) is now based upon both the achromatic a*b* attributes in addition to the magnitude of the pixel's edge-strength. Rather than simply a binary tag resulting in a pixel being labeled/classified as "neutral edge" versus "neutral non-edge, the label 92, 94 can have a value within a predetermined range of values.

FIGS. 5A-5C graphically illustrate the modulation of pixels performed by the neutral edge enhancement component 84. For pixels in the neutral region 88, L* luminance values are modulated as a function of the edge strength 104, as illustrated in FIG. 5A. This means that pixels with a higher edge strength (and higher edge gradient) tend to receive greater L* correction (reduction in L* value) than pixels with a lower edge strength. Chroma components (a*b*) are also modulated as a function of the edge strength, as illustrated in FIG. 5B. This means that pixels with a higher edge strength (and higher edge gradient) tend to receive greater correction (a*b* values moved closer to 0) than pixels with a lower edge strength. These two operations are combined, as illustrated in FIG. 5C.

By way of example, arrows 112, 114, and 116 indicate the extent in which a respective pixel is moved towards pure black. The movement of $Pixel_C$ (associated with arrow 116) is greatest since the a*b* components are closer to the L* neutral axis and/or by exhibiting a higher edge-strength level relative to either $Pixel_B$, associated with arrow 114, or $Pixel_A$, associated with arrow 112. Likewise, $Pixel_B$ is adjusted more toward pure black than $Pixel_A$, due to its a*b* components being closer to the L* neutral axis and/or higher edge-strength value relative to $Pixel_A$.

The result of the luminance and chroma modulations as a function of edge strength results in improved print quality while minimizing switching artifacts during subsequence pixel to pixel gray→K conversion.

FIGS. 6A-6B illustrate one embodiment of the neutral edge enhancement component 84 that processes the incoming L*a*b* image and applies a multiplying factor to each pixel based upon the neutral and chroma adjustment factors 92, 94, 96 as well as the pixel's edge-strength 104.

In one embodiment, the input (e.g., 16 bpp) edge gradient 102 may be normalized by a normalization component 130 to a scale of from 0 to 255, which is input to a programmable 256-element floating-point edge strength LUT 106 with a range between 0.0 to 1.0, corresponding to a low-edge and high-edge gradient, respectively.

The global programmable neutral and chroma adjustment factors 120, 122 are optional. They facilitate easily modifying the level of neutral edge enhancement without requiring changes in either the trilinear interpolation component 80 or the parameters of the edge-strength LUT 106. In one embodiment, the global programmable neutral and chroma adjustment factors 120, 122 are both set to 1.00 for a default mode used for processing color and autocolor copy print jobs/images. For a second mode, the neutral and chroma adjustment factors 120, 122 may be set to higher values (greater than 1), e.g., for enhancing the neutral edges in a text job/mage. For a third mode, the neutral and chroma adjustment factors 120, 122 may be set to a lower value (less than 1), e.g., for processing photographs. The method is not limited to any specific number or type of modes and may have fewer or more than the exemplary default, text, and photo modes. Additionally, the neutral and chroma adjustment factors 120, 122 need not both have the same value in one or more modes.

As illustrated in FIGS. 6A-6B, a first luminance difference value ($\Delta L_1$) 140 is generated as a function 142 (e.g., a product) of the input L* value and the first neutral adjustment factor 92. Similarly, a second luminance difference value ($\Delta L_2$) 144 is generated as a function 146 (e.g., a product) of the input L* value and the second neutral adjustment factor 94. $\Delta L_1$ is used for processing monochrome images while $\Delta L_2$ is used for processing the luminance component of color images. In the case where the images to be processed are all considered to be monochrome or all considered to be color, it is not necessary to compute both $\Delta L_1$ and $\Delta L_2$. In another embodiment, a single $\Delta L$ could be computed which is used for monochrome and color images by using a common neutral adjustment factor.

$\Delta L_1$ 140 is modified as a function 148 (e.g., product) of the edge strength 104 and as a function 150 of (e.g., product) of the global neutral adjustment factor 120. Function 152 computes a difference between the input L* value and the modified $\Delta L_1$ value to generate an output (adjusted) $L_1^*$ value 154. Similarly, $\Delta L_2$ 144 is modified as a function 158 (e.g., product) of the edge strength 104 and as a function 160 of (e.g., product) of the global neutral adjustment factor 120. Function 162 computes a difference between the input L* value and the modified $\Delta L_2$ value to generate an output (adjusted) $L_2^*$ value 154.

While FIGS. 6A-6B illustrate the computations stepwise, a single computation may be used:

$$L_1^* = L^* - (L^* \times NA1 \times ES \times GN) \quad (1) \text{ (or a function thereof)}$$

and $$L_2^* = L^* - (L^* \times NA2 \times ES \times GN) \quad (2) \text{ (or a function thereof)},$$

where NA1 is the first neutral adjustment factor 92,
NA2 is the second neutral adjustment factor 94,
ES is the edge strength 104 for the pixel,
and GN is the global neutral adjustment factor 120.

As is evident, assuming GN is a constant, the output $L_1^*$ of a pixel will be higher, relative to a pixel with the same input L* value, if it has a higher edge strength, and similarly for the output $L_2^*$. Additionally, it can be seen that if either of the multipliers NA1 (or NA2) and ES is 0, the pixel receives no adjustment to the input L* value.

Similarly, as illustrated in FIGS. 6A-6B, the chroma input values a* and b* are processed, as follows:

At 170, the input a* value (which is in a range of 0 to 255 for 8 bpp) is converted to a signed range by subtracting 128 from the input a* value of the pixel. A function 172 (e.g., product) of the signed a* value (which can be positive or negative) and the chroma adjustment factor 120 is computed to generate $\Delta a$. Similarly, at 174, the input b* value (which is in a range of 0 to 255 for 8 bpp values) is converted to a signed range by subtracting 128 from the input b* value of the pixel. A function 176 (e.g., product) of the signed b* value (which can be positive or negative) and the chroma adjustment factor 120 is computed to generate $\Delta b$.

A function 178 (e.g., product) of $\Delta a$ and the edge strength 104 is computed followed by a function 180 of the global chroma adjustment factor 122 to generate a modified $\Delta a$. At 182, a difference is computed between the input a* and the modified $\Delta a$. At 184, 128 is added to the computed difference to generate an adjusted a* value 186, which is once again in the range 0-255.

A function 188 (e.g., product) of $\Delta b$ and the edge strength 104 is computed followed by a function 190 of the global chroma adjustment factor 122 to generate a modified $\Delta b$. At 192, a difference is computed between the input b* and the modified $\Delta b$. At 194, 128 is added to the computed difference to generate an adjusted b* value 196, which is once again in the range 0-255.

As will be appreciated, the adjusted a* and b* values 186 and 196 can be computed with a single equation, rather than stepwise as shown:

$$a_{adj}^* = a^* - ((a^* - 128) \times CA \times ES \times GC) + 128 \quad (3) \text{ (or a function thereof)}$$

and $$b_{adj}^* = b^* - ((b^* - 128) \times CA \times ES \times GC) + 128 \quad (4) \text{ (or a function thereof)},$$

where $a_{adj}^*$ is the adjusted a* value 186,
$b_{adj}^*$ is the adjusted b* value 196,
CA is the chroma adjustment factor 96,
ES is the edge strength 104 for the pixel,
and GC is the global chroma adjustment factor 120.

As for the L* processing, it can be seen that if either of the multipliers CA and ES is 0, the pixel receives no adjustment to the input a* and b* values.

As will be appreciated, the above equations are applicable to 8 bpp values. For other pixel depths, 128 in the above equations is replaced by the midpoint M of the range. E.g., for 4 bits per pixel (a range of 0-15), M would be 7.

Figure 7:
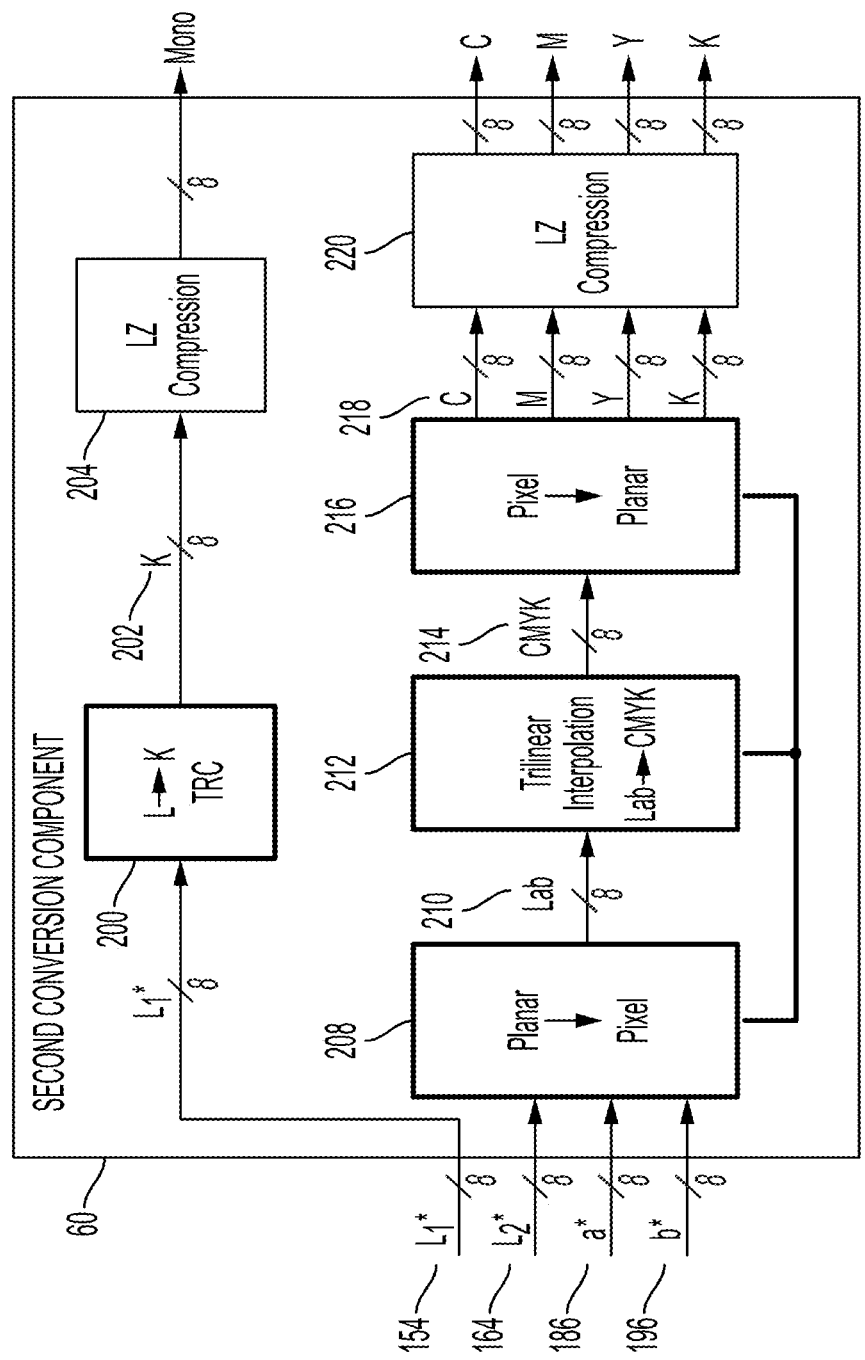
FIG. 7 illustrates an exemplary second conversion component for the system of FIG. 1.

With reference now to FIG. 7 an example second conversion component 60 is illustrated. The second conversion component 60 converts the adjusted $L_1^*$ value 154, adjusted value $L_2^*$ 164, adjusted a* value 186, and adjusted b* value 196 to a device-specific color space, such as monochrome K and/or color CMYK. For the monochrome channel, an L to K tone reproduction curve (TRC) converts the adjusted $L_1^*$ value 154 to a K value 202, such as an 8 bbp value. A compression component 204, e.g., employing LZ4 compression (lossless compression), optionally compresses the monochrome image pixels to reduce storage requirements. Decompression is then performed prior to rendering the image.

For color images, the adjusted $L_2^*$ value 164, adjusted a* value 186, and adjusted b* value 196 may be input to a planar to pixel component 208, which simply concatenates the $L_2^*$, a*, and b* vales to form a 24-bit Lab sequence 210. An interpolation component 212, such as a trilinear interpolation component, converts the Lab sequence 210 to a CMYK sequence 214 (32 bpp). The trilinear interpolation component includes a set of lattice points in 3D space encompassing at least a portion of the Lab color space. Each lattice point is associated, e.g., in an LUT, with respective CMYK values. Given an input pixel, the eight lattice points forming a box around the Lab values of the pixel are identified. Linear interpolation is applied to determine the Euclidean distance to each of the lattice points and the weight which should be applied to the respective CMYK values as an inverse function of the computed distances. The weighted aggregate of the 8 CMYK values is output as a (32 bpp) sequence 214. As an alternative to linear interpolation, a larger LUT could be generated which includes all possible combinations of Lab and CMYK values, but this may incur too large memory requirements for many applications. A pixel to planar component 216 converts the CMYK sequence 214 to independent C, M, Y, and K values 218. A compression component 220, e.g., employing LZ4 compression (lossless compression), optionally compresses the color image pixels to reduce storage requirements. Decompression is then performed prior to rendering the image.

Figure 8:
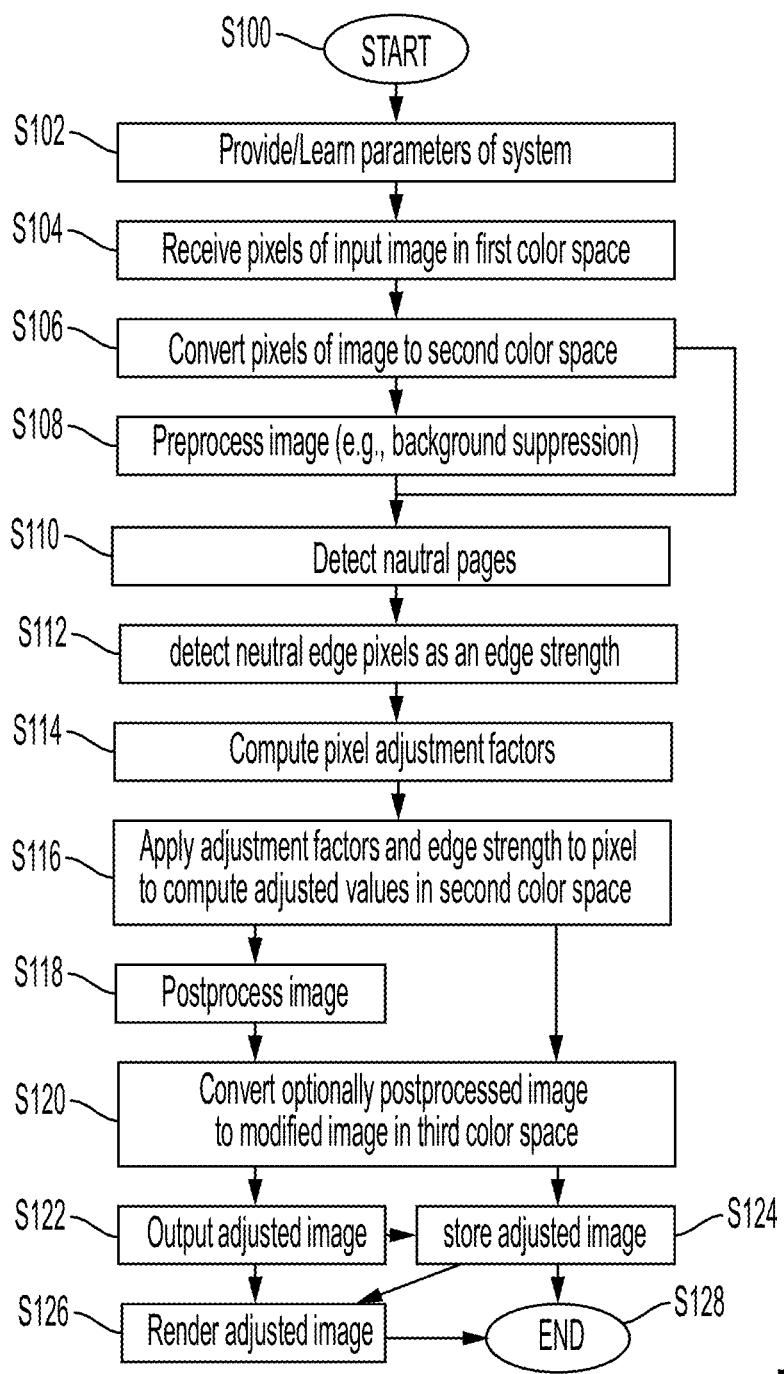
FIG. 8 illustrates a method for image modification in accordance with another aspect of the exemplary embodiment.

With reference to FIG. 8, a method for neutral edge enhancement which may be performed with the system of FIG. 1 is illustrated. The method begins at S100.

At S102, parameters of the system are provided. This may include learning and/or setting parameters of LUTs (or other suitable data structures which are referred to generally as LUTs) global adjustment parameters, and other parameters. User selections of global neutral and chroma adjustment factors 120, 122 may be received via the user interface 40.

At S104, an input image to be processed is received, such a scanned image of a hardcopy document, and may be stored in memory. The input image includes pixels in a first color space.

At S106, the original image is converted to a suitable color space for processing, such as L*a*b*.

At S108, the converted image may be preprocessed in one or more preprocessing operations. These may include background suppression, as described, for example, in above-mention copending application Ser. No. 16/830,419.

At S110, neutral pages, if any, may be detected. These pages are assigned to a monochrome (K-only) path. The remaining pages are assigned to a color processing path.

At S112, detection of neutral edge pixels is performed with the edge detection component 82. An edge strength 104 is assigned to each pixel of the optionally preprocessed image or at least a region of the image, based on the luminance value of the pixel and luminance values of a set of local pixels, e.g., forming a 3×3 grid.

At S114, adjustment factors 92, 94, 96 are computed for the optionally preprocessed image pixel as a function of the pixels input L*a*b* values, using the trilinear interpolation component 80. Steps S112 and S114 may be performed sequentially or contemporaneously.

At S116, neutral edge adjustment is performed on the pixels of the optionally preprocessed image. Further details on the neutral edge adjustment step are described below, with reference to FIG. 9.

At S118, the neutral edge-adjusted image may be post-processed in one or more post-processing operations.

At S120, the neutral edge-adjusted, optionally post-processed image is converted to an output image in an output device color space, such as CMYK (for a printer), RGB (for a color monitor). In the case of a monochrome image, the output device color space may be K (black).

At S122, the adjusted image is output.

At S124, the output image may be rendered in hardcopy form, by printing. Alternatively, or additionally, at S126, the output image may be stored in memory, e.g., for later viewing on a screen, or for subsequent processing.

The method ends at S128.

Figure 9:
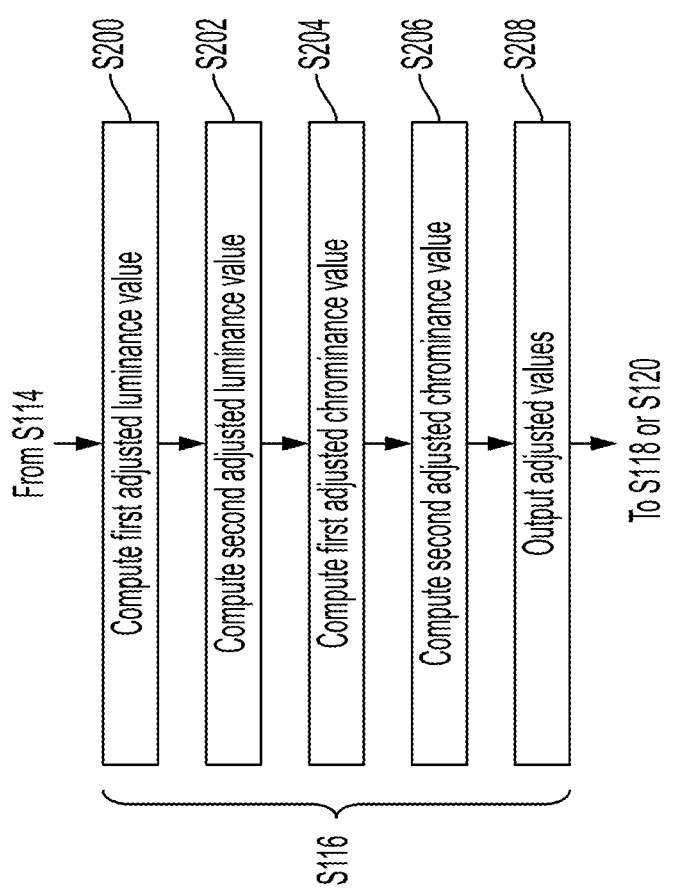
FIG. 9 illustrates neutral edge enhancement processing in the method of FIG. 8.

With reference now to FIG. 9, step S116 includes:

At S200, a first adjusted luminance value 154 is computed as a function of some or all the parameters described in Eqn. 1.

At S202, a second adjusted luminance value 164 is computed as a function of some or all the parameters described in Eqn. 2.

At S204, a first adjusted chrominance value 186 is computed as a function of some or all the parameters described in Eqn. 3.

At S206, a second adjusted chrominance value 196 is computed as a function of some or all the parameters described in Eqn. 4.

As will be appreciated, for color images (as determined by the neutral page detection component), step S200 may be omitted and for monochrome images, steps S202, S204, and S206 may be omitted. Steps S200, S202, S204, and S206 may be performed sequentially or contemporaneously.

At S208, the adjusted values (which in some, but not all, cases may have the same values as the input values) are output.

The method illustrated in FIGS. 8 and 9 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use. The computer program product may be integral with the image adjustment unit 12 (for example, an internal hard drive of RAM), or may be separate (for example, an external hard drive operatively connected with the unit 12), or may be separate and accessed via a digital data network such as a local area network (LAN) or the Internet (for example, as a redundant array of inexpensive or independent disks (RAID) or other network server storage that is indirectly accessed by the unit 12, via a digital network).

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphics card CPU (GPU), or PAL, or the like. In general, any device, capable of implementing a finite state machine that is in turn capable of implementing the flowchart shown in FIGS. 8 and/or 9, can be used to implement the method for image adjustment. As will be appreciated, while the steps of the method may all be computer implemented, in some embodiments one or more of the steps may be at least partially performed manually. As will also be appreciated, the steps of the method need not all proceed in the order illustrated and fewer, more, or different steps may be performed.

Examples

Figure 10:
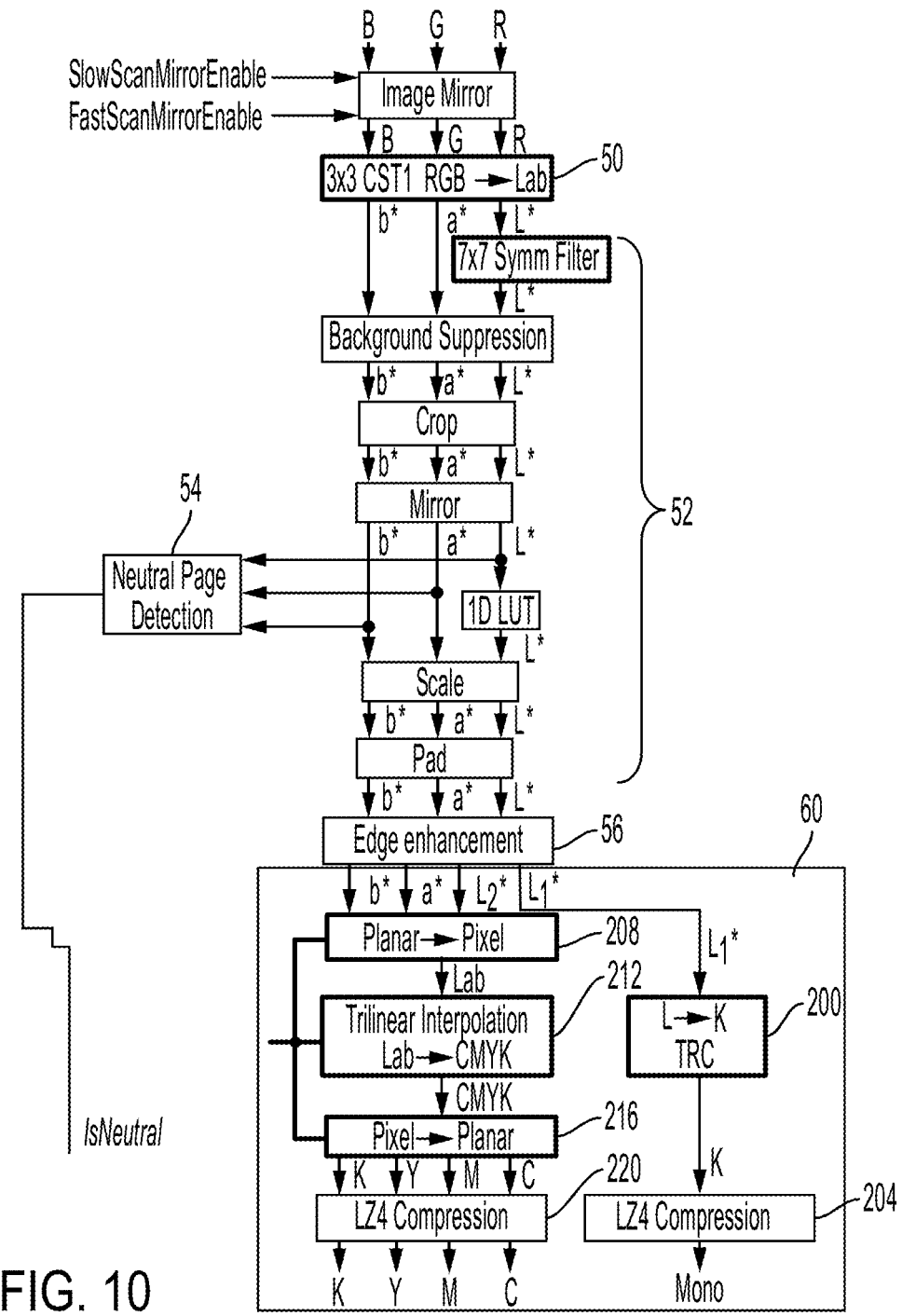
FIG. 10 illustrates an image processing pathway designed for evaluating and implementing the method.

FIG. 10 illustrates an image processing pathway used to evaluate the system and method. The pathway includes a first conversion component 50, various preprocessing components 52, an edge detection and enhancement component 56, as described for FIG. 6, including an Intel trilinear interpolation component 80, 3×3 Sobel edge detection 90, and edge magnitude kernels 100, connected to a neutral edge enhancement kernel 84. The edge enhancement kernel 84, as described above, processes the incoming L*a*b* image and applies a multiplying factor to each pixel based upon the neutral and chroma adjust factors as well as the pixel's edge-strength component. The input 16 bpp edge gradient is normalized to 255, which drives a programmable 256-element floating-point edge strength LUT with a range between 0.0 to 1.0, corresponding to a low-edge and high-edge gradient, respectively. The L*a*b* values of a highly-achromatic, high-gradient edge pixel will be driven toward pure-black. In effect, for edge-pixels classified as being more neutral, their L*a*b* values are dynamically adjusted towards pure-black in a variable rather than binary manner in order to avoid and minimize the abrupt switching artifacts that are traditionally problematic in threshold-based binary tagging segmentation algorithms. The system utilizes an ApolloLake multi-threaded, multi-tiled, GPU processor using simd (vectorized) intrinsics for high-speed operation.

Figure 11:
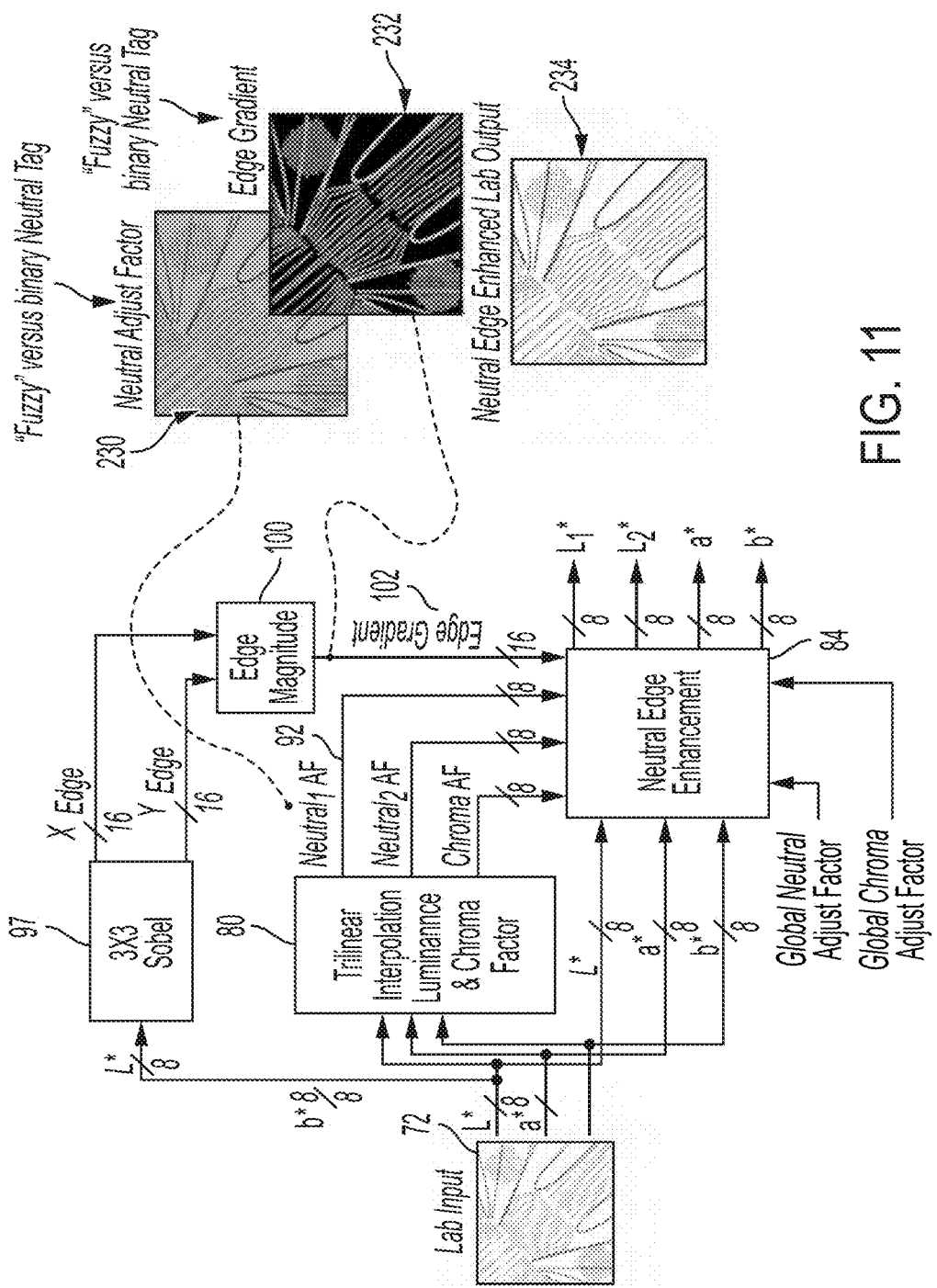
FIG. 11 illustrates processing of a portion of an example line image with the exemplary method.

FIG. 11 illustrates processing of a portion of an example graphical image 72 which is in L*a*b* space. The first neutral adjust factors are illustrated in image 230 and computed edge gradients are illustrated in micro-image 232. When processed by the neutral edge enhancement component, the output is as shown in micro-image 234. The result of the adjustment is that edges are more clearly defined, without severe switching artifacts.

Figure 12:
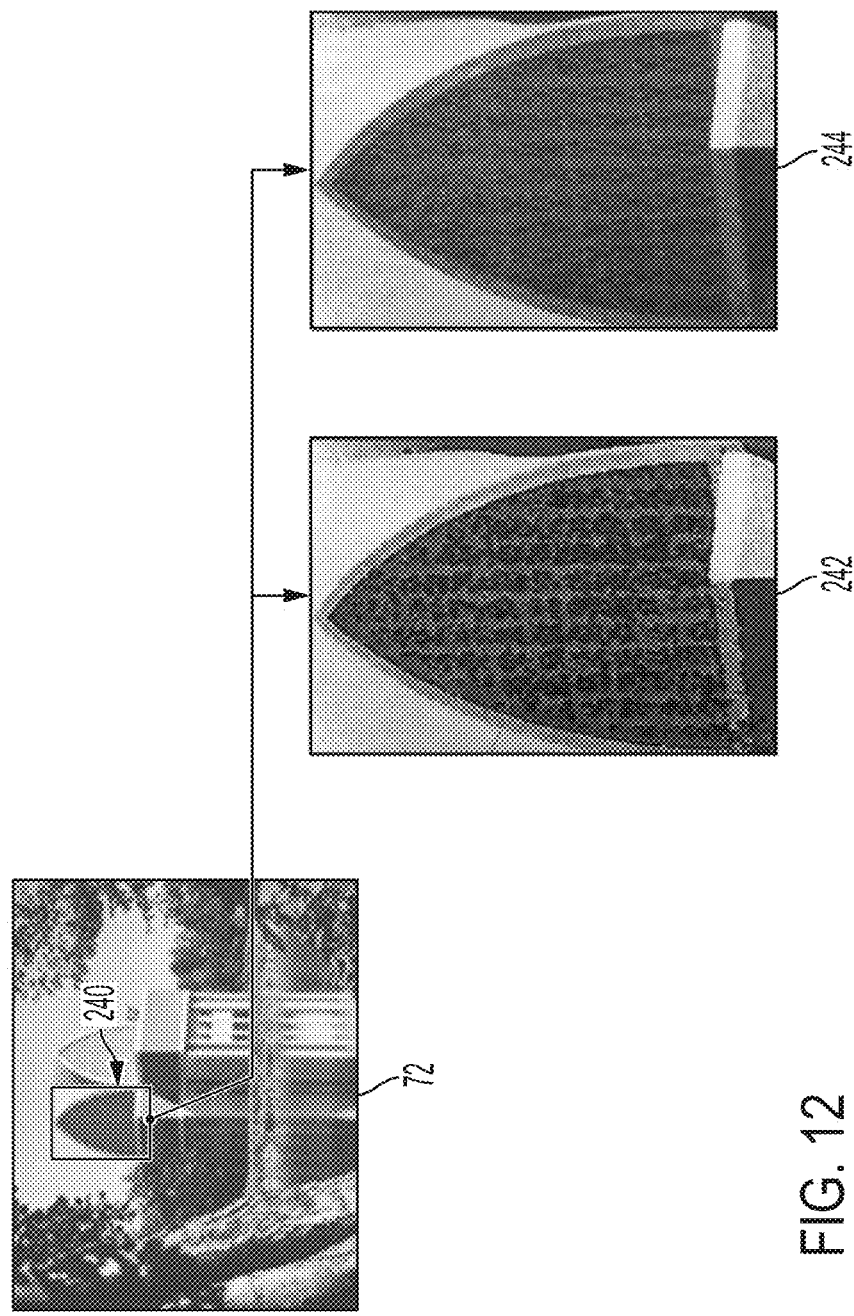
FIG. 12 compares processing of a portion of an example photographic image with a conventional method and with the exemplary method.

FIG. 12 illustrates processing of a portion 240 of an example photographic image 72. Using a conventional remove-fringe algorithm for edge processing, relatively severe switching artifacts can be generated due to pixel segmentation misclassifications. These artifacts are especially noticeable in large regions containing process-gray such as illustrated in the arched window region shown in micro-image 242, where the output rendering abruptly switches between process-gray and K-only. In particular, the reflectance density differences between depositing process-gray (CMY) compared with pure K-only pixels creates sharp visual discontinuities between these two rendering regions.

The micro-photo 244, however, show the benefits of applying a variable neutral edge enhancement, where the objectionable switching artifacts observed within the arched window are virtually eliminated.

Figure 13:
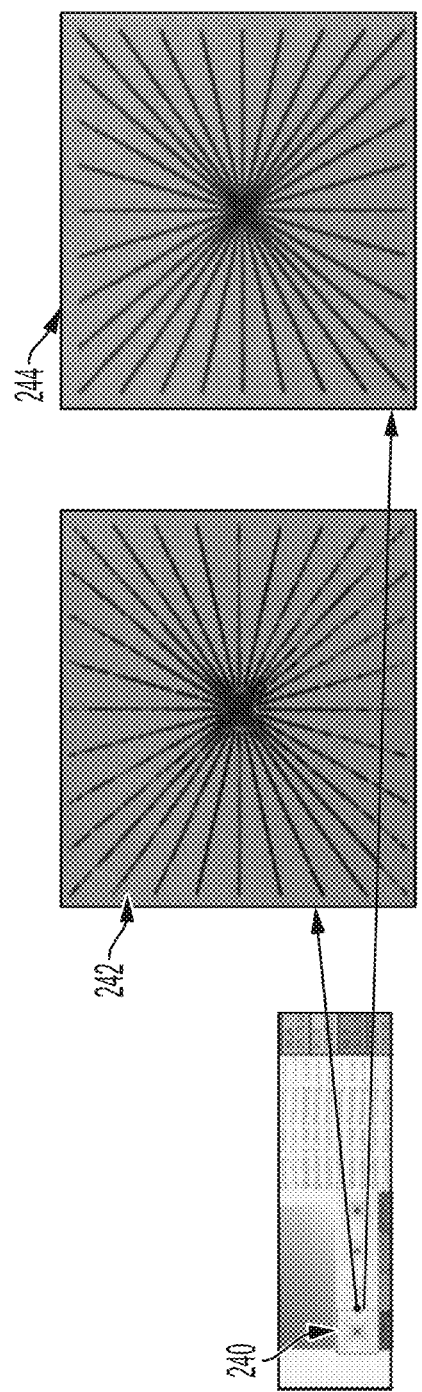
FIG. 13 compares processing of a portion of an example line image with a conventional method and with the exemplary method.

The inability to accurately detect achromatic/neutral edges can cause a similar effect in line-art, as illustrated in FIG. 13, and in text (not illustrated herein). In the case of text, the method has the ability to enhance edges of black text without detrimentally impacting or causing any collateral artifacts in colored text and/or line-art. There is also edge enhancement to the edges of colored (e.g., blue) text, although the enhancement is less pronounced. This slight blue-text enhancement may be reduced/suppressed by minor adjustments to the trilinear interpolation parameters. Text-in-tint is not adversely affected due to the less abrupt gradient edges generated on these halftone-text transitions.

In these examples, the global neutral and chroma adjust factors 120, 122 were set to 1.00 and 1.00, respectively, for color and autocolor copy default modes. These values were increased for a text mode in order to further enhance the neutral edges and decreased for a photo mode. The amount of edge enhancement can be adjusted, using the user interface 40, in relatively small increments using these global factors.

FIG. 14 illustrates the effect of changes in the global neutral and chroma adjust factors 120, 122 on text snippets. When these factors are set to 0, no adjustment occurs. A user could review samples of text printed using different global adjustment factors and select the one giving the optimal image quality, or could select between photos, text and graphics for selecting preset adjust factors 120, 122.

For example, the user may determine that 75% modulation offers the best IQ, while another may prefer 100%. Above 100% it appears that image quality progressively deteriorates. Further, the trilinear interpolation kernel's input remapping and lattice points could also be adjusted/modified to target colored edges around text and line-art, if desired.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:
1. An image processing device comprising:
   memory which stores:
      a neutral edge detection and enhancement component which for each of a plurality of pixels of an input image, each having an input luminance value and input chrominance values:
         computes an edge strength for the pixel as a function of differences between the input luminance value of the pixel and input luminance values of neighboring pixels;
         computes a neutral adjustment factor for the pixel as a function of the input luminance value of the pixel;
         optionally computes a chroma adjustment factor for the pixel as a function of the input chrominance values of the pixel; and
         computes at least one of:
            an adjusted luminance value for the pixel as a function of the input luminance value, the edge strength, and the neutral adjustment factor; and adjusted chrominance values for the pixel as a function of the input chrominance value, the edge strength, and the chroma adjustment factor; and an image output component which outputs an output image derived from the at least one of the adjusted luminance and adjusted chrominance values for the plurality of pixels, and a processor which implements the neutral edge detection and enhancement component and image output component.

2. The image processing device of claim 1, wherein the neutral edge detection and enhancement component computes the luminance differences for a row of at least three pixels containing the pixel and computes the luminance differences for a column of at least three pixels containing the pixel and determines an edge gradient as a function of the luminance differences for the column and the luminance differences for the row, the edge strength being a non-binary function of the edge gradient.

3. The image processing device of claim 2, wherein the edge strength is a non-linear function of the edge gradient.

4. The image processing device of claim 1, wherein the neutral adjustment factor for the pixel is computed as a non-linear function of the input luminance value of the pixel.

5. The image processing device of claim 4, wherein the non-linear function assigns a value of 0 to the neutral adjustment factor for the pixel when the pixel is in a defined chromatic region of a luminance-chrominance color space and assigns a value of greater than 0 when the pixel is not in the defined chromatic region of the luminance-chrominance color space.

6. The image processing device of claim 1, wherein the chroma adjustment factor for the pixel is computed as a non-linear function of the input chrominance values of the pixel.

7. The image processing device of claim 6, wherein the non-linear function assigns a value of 0 to the chroma adjustment factor for the pixel when the pixel is in a defined chromatic region of a luminance-chrominance color space and assigns a value of greater than 0 when the pixel is not in the defined chromatic region of the luminance-chrominance color space.

8. The image processing device of claim 1, wherein the adjusted luminance value comprises a first adjusted luminance value computed as a function of a first neutral adjustment factor and a second adjusted luminance value computed as a function of a second neutral adjustment factor.

9. The image processing device of claim 1, wherein:
the adjusted luminance value for the pixel is also a function of a selectable global neutral adjustment factor, and/or
the adjusted chrominance values for the pixel are also a function of a selectable global chroma adjustment factor.

10. The image processing device of claim 9, further comprising a user interface which receives a user input for selecting at least one of:
the selectable global neutral adjustment factor, and
the selectable global chroma adjustment factor.

11. The image processing device of claim 1, wherein the adjusted luminance value is computed according to at least one of:

$$L_1^* = L^* - (L^* \times NA1 \times ES \times GN) \text{ or a function thereof,}$$

and $$L_2^* = L^* - (L^* \times NA2 \times ES \times GN) \text{ or a function thereof,}$$

where NA1 is a first neutral adjustment factor,
NA2 is a second neutral adjustment factor,
ES is the edge strength for the pixel,
GN is a global neutral adjustment factor, and
L* is the input luminance value.

12. The image processing device of claim 1, wherein the adjusted chrominance values are computed according to:

$$a_{adj}^* = a^* - ((a^* - M) \times CA \times ES \times GC) + M \quad (3) \text{ (or a function thereof), and}$$

$$b_{adj}^* = b^* - ((b^* - M) \times CA \times ES \times GC) + M \quad (4) \text{ (or a function thereof),}$$

where a* is a first of the input chrominance values,
b* is a second of the input chrominance values,
$a_{adj}^*$ is an adjusted first chrominance value,
$b_{adj}^*$ is an adjusted second chrominance value,
CA is a chroma adjustment factor,
ES is the edge strength for the pixel,
GC is a global chroma adjustment factor, and
M is a function of a number of bits per channel of the input chrominance values a* and b*.

13. The image processing device of claim 1, further comprising at least one of:
a first conversion component which converts the plurality of pixels of the input image from an input color space to a luminance-chrominance color space; and
a second conversion component which converts the adjusted luminance value and adjusted chrominance values for the plurality of pixels to an output color space.

14. The image processing device of claim 1, further comprising at least one of:
a preprocessing component which performs preprocessing of the plurality of pixels in the luminance-chrominance color space prior to the computations of the neutral edge detection and enhancement component; and
a postprocessing component which performs postprocessing of the plurality of pixels in the luminance-chrominance color space after the computations of the neutral edge detection and enhancement component.

15. The image processing device of claim 1, further comprising an image output device which renders the output image.

16. The image processing device of claim 15, wherein the image output device comprises at least one of:
a printer which renders the output image on print media, and
a display device which displays the output image on a display screen.

17. An image processing method comprising:
receiving an input image comprising a plurality of pixels;
for each of the plurality of pixels:
computing an edge strength for the pixel as a function of differences between the input luminance value of the pixel and input luminance values of neighboring pixels;
computing a neutral adjustment factor for the pixel as a function of the input luminance value of the pixel;
optionally computing a chroma adjustment factor for the pixel as a function of input chrominance values of the pixel; and computing at least one of:
- an adjusted luminance value for the pixel as a function of the input luminance value, the edge strength, and the neutral adjustment factor; and
- adjusted chrominance values for the pixel as a function of the input chrominance value, the edge strength, and the chroma adjustment factor; and outputting an output image derived from at least one of the adjusted luminance and the adjusted chrominance values for the plurality of pixels.

18. The image processing method of claim 17, wherein the method is performed with a processor.

19. The image processing method of claim 17, further comprising at least one of:
- converting the plurality of pixels of the input image from an input color space to a luminance-chrominance color space;
- converting the adjusted luminance value and adjusted chrominance values for the plurality of pixels to an output color space; and
- printing the output image.

20. An image processing device comprising:
- a neutral edge detection and enhancement component which for each of a plurality of pixels of an input image, each having an input luminance value and input chrominance values:
  - computes an edge strength for the pixel as a function of differences between the input luminance value of the pixel and input luminance values of neighboring pixels;
  - computes a neutral adjustment factor for the pixel as a function of the input luminance value of the pixel;
  - computes a chroma adjustment factor for the pixel as a function of the input chrominance values of the pixel;
  - computes an adjusted luminance value for the pixel as a function of the input luminance value, the edge strength, and the neutral adjustment factor; and
  - computes adjusted chrominance values for the pixel as a function of the input chrominance value, the edge strength, and the chroma adjustment factor; and
- an image output device which receives an output image derived from the adjusted luminance and adjusted chrominance values for the plurality of pixels, and which renders the output image by printing.

* * * * *